Sept. 1, 1925.
H. Y. NORWOOD
THERMOMETER SUPPORT
Filed Oct. 20, 1923
1,551,609
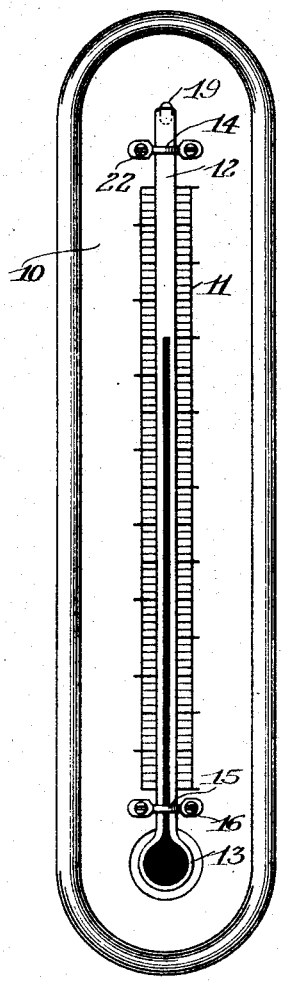
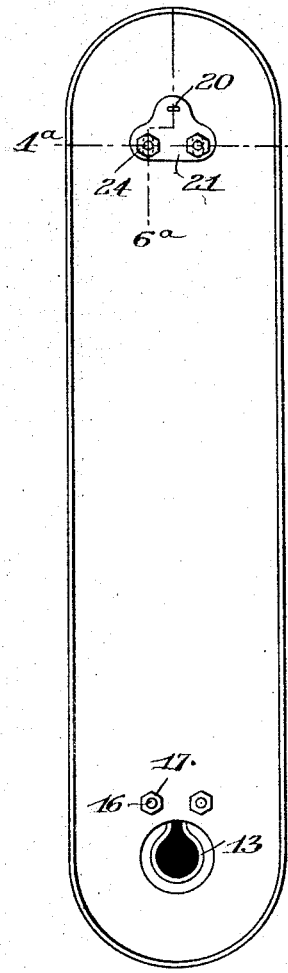
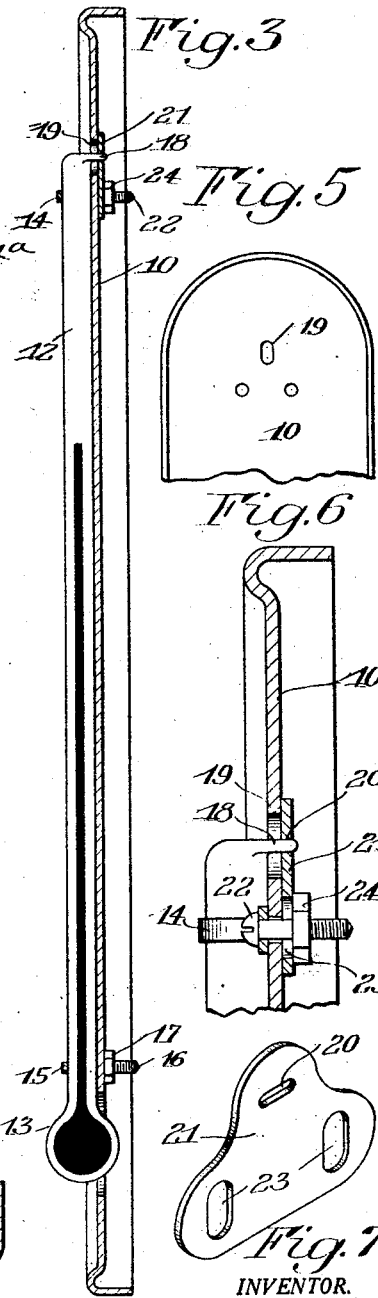
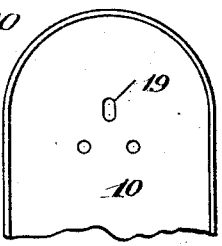
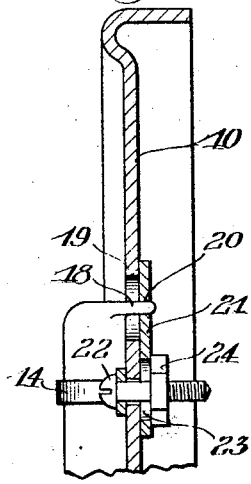
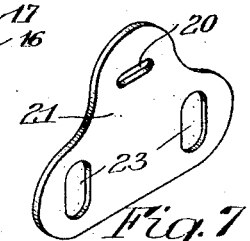
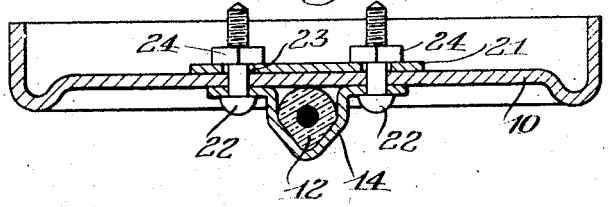
INVENTOR.
Harry Y. Norwood
BY
his ATTORNEY Patented Sept. 1, 1925.

1,551,609

UNITED STATES PATENT OFFICE.

HARRY Y. NORWOOD, OF ROCHESTER, NEW YORK, ASSIGNOR TO THE TAYLOR INSTRUMENT COMPANIES, OF ROCHESTER, NEW YORK, A CORPORATION OF NEW YORK.

THERMOMETER SUPPORT.

Application filed October 20, 1923. Serial No. 669,816.

*To all whom it may concern:*

Be it known that I, HARRY Y. NORWOOD, a citizen of the United States, residing at Rochester, in the county of Monroe and State of New York, have invented certain new and useful Improvements in Thermometer Supports; and I do hereby declare the following to be a full, clear, and exact description of the same, reference being had to the accompanying drawings, forming a part of this specification, and to the reference numerals marked thereon.

This invention relates to thermometer supports and, more particularly, to the variety comprising means for supporting a thermometer tube in adjustable relation with its cooperating scale, to facilitate the accurate assembly of the parts during manufacture and for maintaining the accuracy of the instrument in use, the chief object of the invention being the provision of a device of the above character having a simple, practical and economical form of construction convenient to adjust and of such an inconspicuous nature as not to detract from the appearance of the instrument.

To these and other ends the invention resides in certain improvements and combinations of parts all as will be hereinafter more fully described, the novel features being pointed out in the claims at the end of the specification.

In the drawings:

Fig. 1 is a front elevation of a thermometer mounting embodying the present invention;

Fig. 2 is a rear elevation of the same;

Fig. 3 is an enlarged longitudinal section thereof;

Fig. 4 is an enlarged transverse section on the line 4ª—4ª in Fig. 2;

Fig. 5 is a fragmentary view similar to the upper portion of Fig. 2 but with parts detached;

Fig. 6 is an enlarged sectional view on the line 6ª—6ª in Fig. 2, and

Fig. 7 is an enlarged perspective view of an adjusting plate detached.

Similar reference numerals throughout the several views indicate the same parts.

The preferred embodiment of the invention herein disclosed by way of illustration is in conjunction with a thermometer mounting of the type adapted, for example for attachment to a window casing, comprising a main support 10 preferably in form of a metal plate of the character shown, the forward side of which has marked thereon or is otherwise provided with a temperature scale 11. Cooperating with the latter is an indicating tube 12 of the usual or any suitable variety constructed of glass with a longitudinal bore and a bulb portion 13 filled with mercury or other suitable temperature responsive fluid. The tube is preferably secured to the supporting means or plate 10 by metal straps 14 and 15 adjacent its top and bottom respectively. The strap 15 is fixed at its ends to the plate by small bolts 16 passed through the strap and the plate with securing nuts 17 thereon in the rear of the plate. While this strap fits the tube closely its engagement therewith is sufficiently light to permit of a longitudinal sliding movement of the tube on the main support under control of the adjusting means hereafter described.

The upper end of the thermometer tube is preferably formed with an angular or rearwardly turned end or finger 18, as well understood in the art, and means are provided for cooperation with this tube end for adjusting the tube longitudinally relative to the main supporting plate 10 and its scale. For this purpose plate 10 is formed with a small opening 19 somewhat elongated longitudinally of the tube and in which the tube end 18 loosely enters with sufficient play longitudinally of the tube to allow the desired range of adjustment for the latter. Preferably the tube end projects somewhat rearwardly of plate 10 and enters an opening 20 in an adjusting means or plate 21 sliding on the rear side of the main plate 10 as shown. While plate 21 may obviously be provided with shoulder or other means projecting somewhat forwardly into opening 19 for engagement with the tube end, it is simpler and preferable to form plate 21 in the flat shape shown and its opening 20 may be somewhat elongated laterally but is of such a width longitudinally of the tube as to closely fit the tube end 18 in this direction, so that adjustment of the plate serves to accurately adjust the tube.

Means are provided for releasably clamping plate 21 in adjusted position on the rear of plate 10, comprising bolt and nut means carried by one of said plates and working in a slot or slots in the other. In the present instance, plate 10 carries two small bolts 22 extending from the forward side thereof on opposite sides of the tube rearwardly through openings in plate 10 in which the bolts are snugly fitted. Rearwardly of plate 10 the bolts pass through slots 23 in plate 21 extending longitudinally of the thermometer tube to provide for adjustment of plate 21, after which the latter is clamped in position by nuts 24 on the bolts.

The bolts or screws 22 carrying the adjusting plate as described are advantageously employed for securing the upper tube strap 14 to the plate 10, this strap also being sufficiently loose to permit of sliding adjustment of the tube. If so desired, this strap may however have such a length as to release the tube for sliding movement as described only when the adjusting means is unclamped and to fixedly clamp the tube on the main plate when the nuts 24 of the adjusting means are turned home for securing plate 21.

In the manufacture of the instrument, the tubes are provided with a reference mark corresponding to a known temperature, as well understood in the art and the supporting plates provided with scales positioned thereon to correspond approximately with the indications of the tubes. The tubes and supports may then be assembled in the manner described and the tube adjusted to register accurately with the scale by unclamping plate 21, adjusting the same to move and adjust the tube and then reclamping the part in position by the means described.

The invention thus provides a simple, effective and inexpensive construction for initially assembling and subsequently adjusting the tube and its mounting and scale. The adjustment may be conveniently and quickly made and the adjusting parts are so constructed and arranged as to be inconspicuous and in fact practically invisible from the front of the instrument so that they do not detract from the appearance of the latter.

I claim as my invention:

1. A thermometer comprising a support provided with a scale, an indicating tube cooperating with said scale and mounted for adjustment longitudinally on the support, a projection on the tube loosely entering an opening in the support, a member mounted for adjustment on the support and formed with an opening in which said projection is engaged, and means releasably clamping said member to the support.

2. A thermometer comprising supporting means provided with a scale, an indicating tube cooperating with said scale and mounted for adjustment longitudinally on said supporting means, said tube having an angularly turned end, an adjustable means mounted on said supporting means and formed with a recess in which said tube end is engaged, and a bolt and nut carried by one of said means and working in a slot in the other for releasably clamping said means together and said tube in adjusted position.

3. A thermometer comprising a supporting plate provided with a scale, an indicating tube cooperating with said scale and mounted for adjustment longitudinally on the support, said tube having a rearwardly turned end loosely entering an opening in said supporting plate, an adjustable plate mounted on the rear of said supporting plate and formed with a recess in which said tube end is engaged, and a bolt and nut carried by one of said plates and working in a slot in the other for releasably clamping said plates together and said tube in adjusted position.

4. A thermometer comprising a supporting plate provided with a scale, an indicating tube cooperating with said scale and mounted for adjustment longitudinally on said supporting plate, said tube having a rearwardly turned end loosely entering an opening in said supporting plate, an adjustable plate mounted on the rear of said supporting plate and formed with a recess in which said tube end is engaged, a strap for holding said tube to said supporting plate, bolts passed through the ends of said strap and said supporting plate and through slots in said adjustable plate and nuts on said bolts for releasably clamping said plates together and said tube in adjusted position.

HARRY Y. NORWOOD.